Patented Feb. 11, 1936

2,030,377

UNITED STATES PATENT OFFICE 2,030,377

IRRADIATION OF VITAMIN D AND PRODUCT THEREOF

Otto Linsert, Wuppertal-Elberfeld, Germany, assignor to Winthrop Chemical Company, Inc., New York, N. Y., a corporation of New York No Drawing. Application October 30, 1933, Serial No. 695,959. In Germany November 5, 1932

6 Claims. (Cl. 260—153)

This invention relates to the isolation of a product from the irradiation products of the vitamin D prepared by irradiation from ergosterol which product is characterized by its increasing action on the level of the blood calcium but is practically antirachitically inactive; the invention further relates to a process of preparing the said product.

It is known that by irradiation of vitamin D, which is the antirachitic active irradiation product of ergosterol, transformation products of the vitamin D are obtainable which in part do not display any physiological action, in part exert another than the antirachitic action of the starting product.

The present invention provides for a process by which a product is isolated from the mixture of the transformation products of vitamin D, which product is essentially characterized by its increasing action on the level of the blood calcium.

In accordance with the present invention a product having an increasing action on the level of the blood calcium is obtained by irradiating highly purified vitamin D prepared by irradiation of ergosterol in the manner known per se with ultra violet light in an inert organic solvent until the absorption maximum of the starting material at 265 mμ substantially disappears. Oxygen is excluded during the irradiation process. As highly purified vitamin D preferably the crystalline product which is obtained by irradiation of ergosterol and melts at 115° to 117° C. is used in this irradiation process. As inert organic solvents, for instance, the lower alcohols, ether and petroleum ether or specific fractions thereof, for instance, heptane, are advantageously used, but it may be mentioned that generally those indifferent solvents which do not exert an essential absorbing effect on the ultra violet light, that is the solvents which do not absorb light of a wave length above 265 mμ may be employed.

As a source of the ultra violet light I preferably use the magnesium spark. The irradiation product thus obtainable is after removal of the solvent transformed into its 3.5-dinitro-benzoic acid ester by the action of 3.5-dinitro-benzoyl chloride in the presence of a tertiary amine at normal or somewhat elevated temperature. Pyridine and quinoline are preferably used as tertiary amines for this esterification process. The esterification is finished at normal temperature after about 12 hours and at elevated temperature, for instance, at water bath temperature, after about 20 minutes. The amine is then removed from the esterification mixture by means of a dilute mineral acid, such as hydrochloric or sulfuric acid. The ester formed is taken up in ether or petroleum ether which advantageously is added to the esterification mixture prior to the treatment with the dilute mineral acid. The solution of the ester in ether or petroleum ether is concentrated to an ester content of about 20 to 30% and is then cooled below 0° C. The first fraction which crystallizes from the solution within about 12 hours is separated from the solution; later fractions substantially consist of esters of physiologically inactive transformation products of vitamin D. The said first fraction, is desired, is recrystallized from acetone, ether methyl alcohol or glacial acetic acid. The ester forms fine yellowish needles which melt at 138° C. and have a specific rotatory power $$\left[\alpha\right]_D^{22} + 33°$$

in a 1% acetone solution. The ester is saponified by means of alkali, preferably by means of an alcoholic caustic alkali solution. The neutral component is separated from the saponification mixture if necessary after dilution with water by extraction with ether or petroleum ether. The extract is washed with water and after drying the solvent is removed in vacuo. A solid resin-like product remains which may be easily transformed into a fine white powder melting at about 50° C. The yield is about 25% of the starting material.

The said irradiation product has according to the analysis the formula $C_{28}H_{44}O$. Its specific rotatory power $$\left[\alpha\right]_D^{22}$$

amounts to −16° in a 1% chloroform solution. The product is obviously a stereoisomer of ergosterol and of the pure crystalline vitamin D. It is insoluble in water but soluble in organic solvents. It is essentially characterized by its remarkable increasing action on the level of the blood calcium, but is practically antirachitically inactive.

The invention is further illustrated by the following example without being restricted thereto:—

*Example.*—50 parts by weight of crystallized antirachitically active irradiation product of ergosterol ("Vitamin D") are dissolved in 900 parts by weight of normal heptane. The solution is irradiated with the light of a magnesium spark during 15 hours. The solution is evaporated to dryness in vacuo at a temperature of about 40° C. and the residue is mixed with a solution of 40 parts by weight of 3.5-dinitro-benzoyl chloride in 250 parts by weight of dry pyridine. After about 12 hours' standing at room temperature (about 20° C.) the pyridine solution is diluted with 2000 parts by weight of petroleum ether while continuously shaking. 500 parts by weight of water are then added to dissolve the pyridine hydrochloride and the mixture is poured off from the red brown resinlike precipitate. The petroleum-ethereal solution is then shaken with dilute hydrochloric acid to remove pyridine and with sodium carbonate to remove excess dinitro benzoic acid. The solution is then dried by means of sodium sulfate and the petroleum ether is distilled off in vacuo at 30° to 40° C. The residue is then taken up with 100 parts by weight of petroleum ether and the solution is stored in a mixture of ice and common salt during 12 to 15 hours. The 3.5-dinitro-benzoic acid ester which thereafter has precipitated in fine drops like solidified gelatine is sucked off, thoroughly washed by means of petroleum ether and dried in vacuo at a low temperature. The yield is about 20 parts by weight of the crude ester. On prolonged standing in a mixture of ice and common salt a crystal mixture separates from the mother lye which consists of the esters of the so-called supra sterol I and II. For the said reason care should be taken that the first fraction of the crude ester of the physiologically active substance is separated from the petroleum ethereal solution of the ester mixture after at most 15 hours so that it is not contaminated by the esters of the supra sterols which later separate from the solution. The crude 3.5-dinitro-benzoic acid ester of the physiologically active substance may be recrystallized from ether-methyl alcohol, acetone or glacial acetic acid. In the case the ester at first precipitates in the form of fine drops it transforms gradually into a fine light-yellow crystal powder on prolonger standing. The crystals have a specific rotatory power $$\left[\alpha\right]_D^{22} +33°$$

in a 1% actone solution. They melt at 130° C. The 3.5-dinitro-benzoic acid ester thus obtained is thereafter saponified by boiling with 5% methyl alcoholic caustic potash during about ¾ of an hour. The potassium-3.5-dinitro-benzoate which has separated is filtered and the filtrate extracted by means of ether. The ethereal extract is dried by means of sodium sulfate and the ether is distilled off in vacuo. 10 to 12 parts by weight of a whitish powder are thus obtained which are readily soluble in the usual organic solvents, but less soluble in cold methyl alcohol. It is distinguished by its high physiological activity which causes an increase of the level of the blood calcium. Its chemical composition corresponds to the formula $C_{28}H_{44}O$. Its specific rotatory power $$\left[\alpha\right]_D^{22}$$

amounts to —16° in a 1% chloroform solution.

I claim:

1. The product of the formula $C_{28}H_{44}O$ having the specific rotatory power $$\left[\alpha\right]_D^{22} -16°$$

in a 1% chloroform solution, which product is a stereoisomer of ergosterol and forms a white powder which melts at about 50° C. and is insoluble in water but soluble in organic solvents and forms a well crystalline ester with meta-dinitrobenzoic acid melting at 138° C. and having a specific rotatory power $$\left[\alpha\right]_D^{22} +33°$$

in a 1% acetone solution, said product being characterized by its increasing action on the level of the blood calcium but is practically antirachitically inactive, and being obtainable by ultra violet irradiation of highly purified vitamin D which is the antirachitically active irradiation product of ergosterol, transformation of the irradiation product obtained into its 3.5-dinitro-benzoic acid ester, separating the crystal fraction first formed and saponifying the said ester by means of alkali.

2. The process which comprises irradiating highly purified vitamin D with ultra violet light in an inert organic solvent until the absorption maximum of the starting material at 265 m$\mu$ substantially disappears while excluding oxygen, transforming the irradiation product into its 3.5-dinitro-benzoic acid ester by the action of 3.5-dinitrobenzoylchloride in the presence of a tertiary amine, separating the amine by means of a dilute mineral acid, dissolving the irradiation product in a solvent selected from the group consisting of ether and petroleum ether, concentrating the solution, cooling the concentrate below 0° C., separating the first ester fraction which precipitates within about 12 hours and saponifying the ester by means of alkali.

3. The process which comprises irradiating highly purified vitamin D with a magnesium spark in an inert organic solvent until the absorption maximum of the starting material at 265 m$\mu$ substantially disappears while excluding oxygen, transforming the irradiation product into its 3.5-dinitro-benzoic acid ester by the action of 3.5-dinitrobenzoylchloride in the presence of a tertiary amine, separating the amine by means of a dilute mineral acid, dissolving the irradiation product in a solvent selected from the group consisting of ether and petroleum ether, concentrating the solution, cooling the concentrate below 0° C., separating the first ester fraction which precipitates within about 12 hours and saponifying the ester by means of alkali.

4. The process which comprises irradiating highly purified vitamin D with ultra violet light in the presence of a solvent selected from the group consisting of lower alcohols, ether and petroleum ether, until the absorption maximum of the starting material at 265 m$\mu$ substantially disappears while excluding oxygen, transforming the irradiation product into its 3.5-dinitro-benzoic acid ester by the action of 3.5-dinitrobenzoylchloride in the presence of a tertiary amine, separating the amine by means of a dilute mineral acid, dissolving the irradiation product in a solvent selected from the group consisting of ether and petroleum ether, concentrating the solution, cooling the concentrate below 0° C., separating the first ester fraction which precipitates within about 12 hours and saponifying the ester by means of alcoholic caustic alkali.

5. The process which comprises irradiating highly purified vitamin D with a magnesium spark in the presence of a solvent selected from the group consisting of lower alcohols, ether or petroleum ether, until the absorption maximum of the starting material at 265 m$\mu$ substantially disappears while excluding oxygen, transforming the irradiation product into its 3.5-dinitro-benzoic acid ester by the action of 3.5-dinitro-benzoyl-chloride in the presence of pyridine, separating the pyridine by means of a dilute mineral acid, dissolving the irradiation product in a solvent selected from the group consisting of ether and petroleum ether, concentrating the solution, cooling the concentrate below 0° C., separating the first ester fraction which precipitates within about 12 hours and saponifying the ester by means of alcoholic caustic alkali.

6. Process as claimed in claim 5 in which the 3.5-dinitro benzoic acid ester is purified by recrystallization prior to its saponification.

OTTO LINSERT.